(12) United States Patent
Parker et al.

(10) Patent No.: US 10,854,196 B1
(45) Date of Patent: Dec. 1, 2020

(54) FUNCTIONAL PREREQUISITES AND ACKNOWLEDGMENTS

(71) Applicant: Amazon Technologies, Inc., Seattle, WA (US)

(72) Inventors: Christopher Geiger Parker, Seattle, WA (US); Ilana Rozanes, Cambridge, MA (US); Sulman Riaz, Seattle, WA (US); Vinaya Nadig, Redmond, WA (US); Hariharan Srinivasan, Redmond, WA (US); Ninad Anil Parkhi, Sammamish, WA (US); Michael Richard Baglole, Seattle, WA (US); Eric Wei Hoong Ow, Los Altos, CA (US); Tina Sonal Patel, Los Altos, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 282 days.

(21) Appl. No.: 15/902,973

(22) Filed: Feb. 22, 2018

Related U.S. Application Data

(60) Provisional application No. 62/595,032, filed on Dec. 5, 2017.

(51) Int. Cl.
| | |
|---|---|
| *G10L 15/22* | (2006.01) |
| *G06N 5/02* | (2006.01) |
| *G06N 3/02* | (2006.01) |
| *G10L 15/16* | (2006.01) |
| *G10L 13/00* | (2006.01) |
| *G10L 17/00* | (2013.01) |

(52) U.S. Cl.
CPC ............ *G10L 15/22* (2013.01); *G06N 3/02* (2013.01); *G06N 5/022* (2013.01); *G10L 13/00* (2013.01); *G10L 15/16* (2013.01); *G10L 17/00* (2013.01); *G10L 2015/223* (2013.01)

(58) Field of Classification Search
CPC ...................................................... G10L 15/22
See application file for complete search history.

(56) References Cited

U.S. PATENT DOCUMENTS

| | | | |
|---|---|---|---|
| 8,121,946 B1 * | 2/2012 | Arguello | G06Q 20/102 705/38 |
| 2003/0135740 A1 * | 7/2003 | Talmor | G06F 21/32 713/186 |
| 2008/0022111 A1 * | 1/2008 | Dietl | G06F 21/64 713/176 |
| 2012/0303962 A1 * | 11/2012 | Ghani | G06O 20/3821 713/176 |
| 2017/0132199 A1 * | 5/2017 | Vescovi | G06Q 10/06311 |
| 2017/0142589 A1 * | 5/2017 | Park | H04W 12/08 |

* cited by examiner

*Primary Examiner* — Michael N Opsasnick
(74) *Attorney, Agent, or Firm* — Polsinelli PC

(57) ABSTRACT

Using a method of operating a system that includes remote servers, and at least one electronic device, a user verbally instructs the electronic device to activate a function. The system uses the remote servers and other parts of the system to determine that the function is not currently enabled and requires a user-acknowledgment to terms of use before the function is enabled. The system provides information on the terms of use and solicits a user-acknowledgment to the terms of use. The user provides a verbal acknowledgment of the terms of use and the verbal acknowledgment is received and stored in a persistent data store.

20 Claims, 8 Drawing Sheets

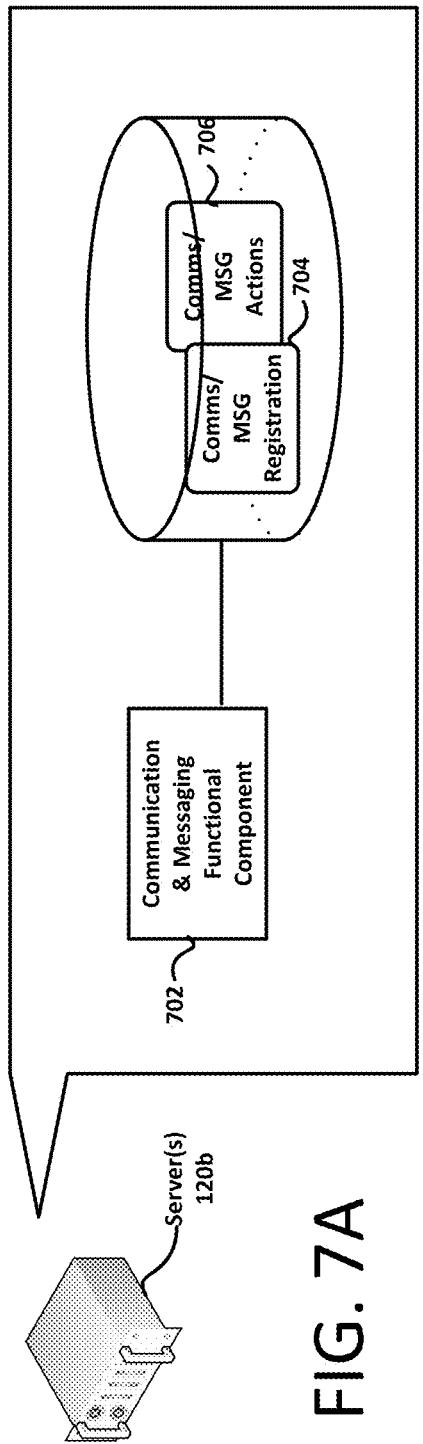
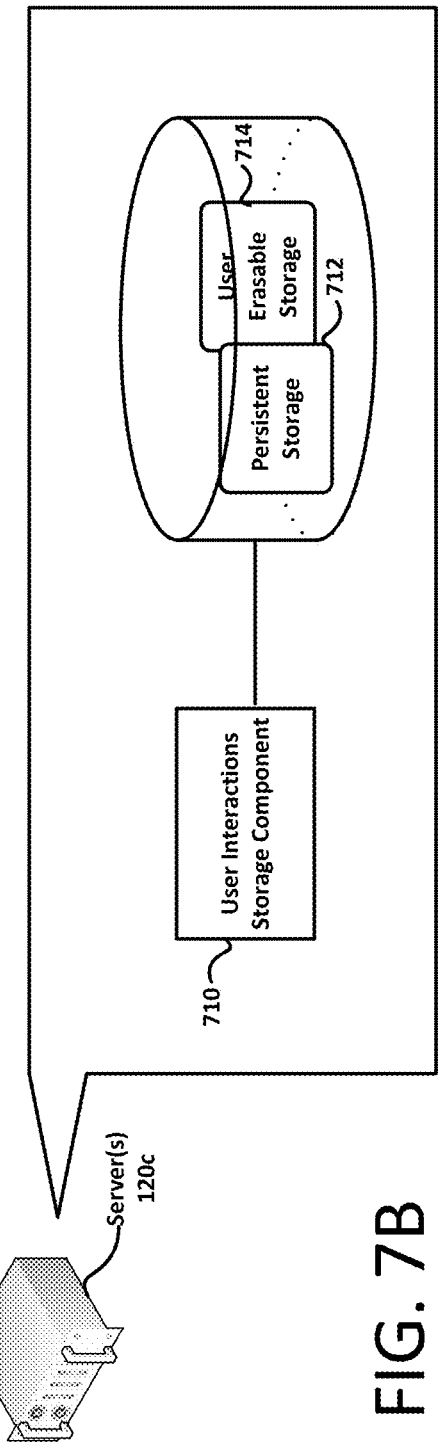
FIG. 7A
FIG. 7B

FUNCTIONAL PREREQUISITES AND ACKNOWLEDGMENTS

CROSS-REFERENCE TO RELATED APPLICATIONS

This application claims priority to U.S. Provisional Patent Application Ser. No. 62/595,032, entitled "FUNCTIONAL PREREQUISITES AND ACKNOWLEDGMENTS," filed Dec. 5, 2017, which is hereby incorporated by reference, in its entirety and for all purposes.

BACKGROUND

Users interact with applications and functions of the applications using verbal and other interfaces. As a prerequisite to implementing or activating those applications and functions, user acknowledgment of certain terms or agreements, such as terms of use, is often desired and may be required. Audit trails of the acknowledgments may also be desired or necessary.

BRIEF DESCRIPTION OF THE DRAWINGS

Various embodiments in accordance with the present disclosure will be described with reference to the drawings, in which:

FIG. 7A illustrates an architecture for implementing communication and messaging functionality in remote servers of the system;

FIG. 7B illustrates an architecture for implementing storage functionality of user interactions in remote servers of the system;

While the disclosed technology is described herein by way of example for several embodiments and illustrative drawings, those skilled in the art will recognize that the disclosed technology is not limited to the embodiments or drawings described herein. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the words "can" or "may" are used in a permissive sense (i.e., meaning having the potential to), rather than the mandatory sense (i.e., meaning must). Similarly, the words "include", "including", and "includes" mean including, but not limited to.

DETAILED DESCRIPTION

A user may have electronic devices that perform speech processing and interpret voice commands, and may position those electronic devices in different locations of different environments where they work and live. The user may want to use those electronic devices to communicate with other electronic device, in addition to communicating with mobile cellular telephones. Before using certain functions, such as making and receiving communications and activating features of the electronic devices, the user may need to satisfy certain prerequisites. The prerequisites might include acknowledging terms of use, where the terms of use may be unique to the communications and/or communication medium. Generally a user's verbal interactions with the system are saved or otherwise stored, but if the user so requests, those user verbal interactions can be erased or otherwise deleted. When a user verbally acknowledges terms of use, the verbal acknowledgment is saved or stored along with all the other user verbal interactions. There might be a need to maintain an audit trail of the prerequisites, including the user-acknowledged terms of use. To ensure that the audio trail of prerequisites is not erased or deleted, once the user has acknowledged the terms of use, the acknowledgment is linked or otherwise associated to a user profile that is associated with the electronic device, and the acknowledgment is stored in a persistent data store that is not erased or deleted in the event that the user requests. The implementations described herein illustrate some of the ways user-acknowledged terms of use for the electronic devices can be received and stored in such a persistent data store that is not erased based on a user request, particularly for audit purposes.

These examples and others are described in greater detail below with reference to the accompanying FIGS.

Figure 1:
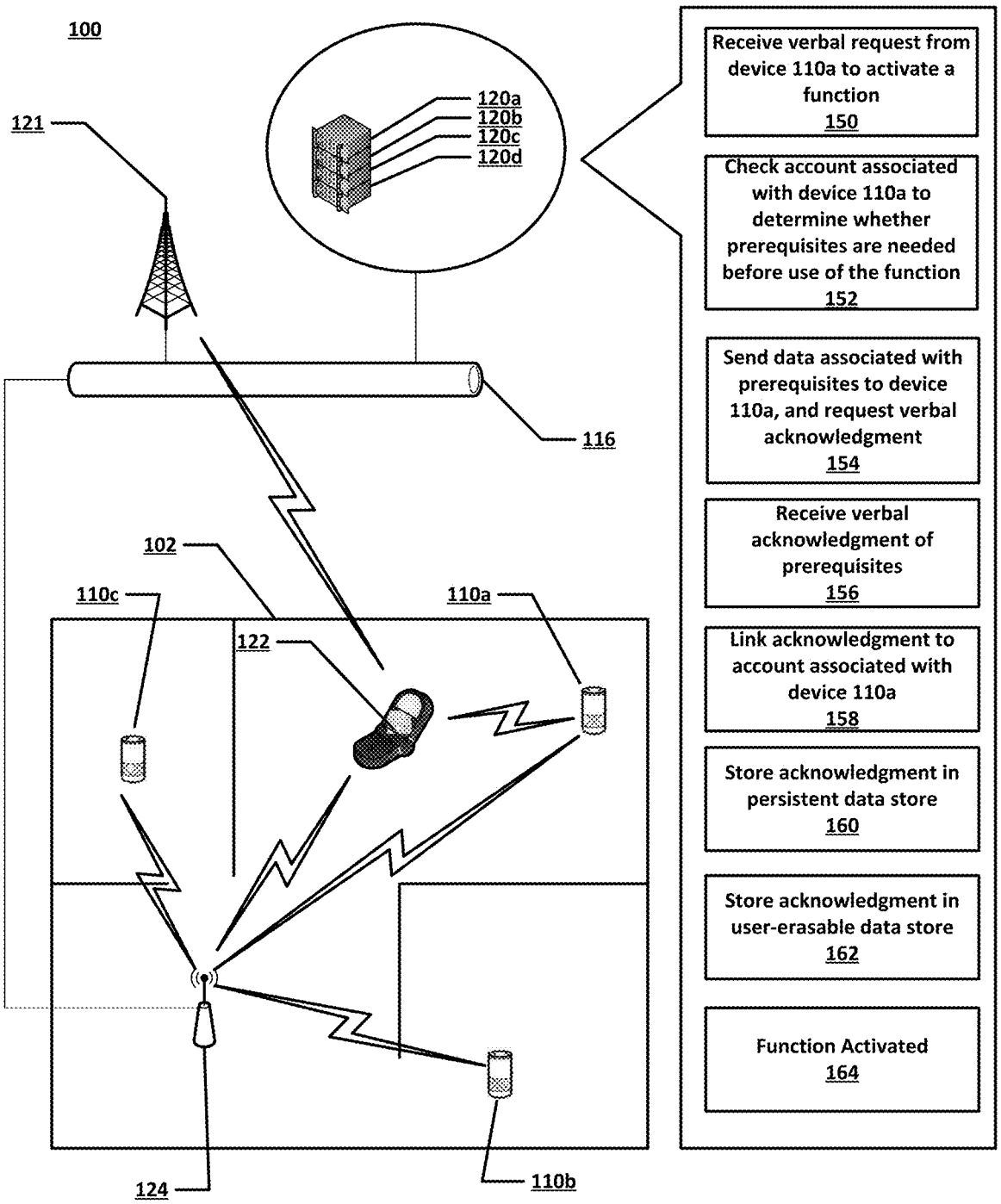
FIG. 1 illustrates an architecture that includes multiple devices that are physically situated in environments to implement functions, communicate over wired and wireless communication links, generate and capture audio, and respond to a user's audio commands.

FIG. 1 shows an illustrative voice interaction computing architecture 100 set in an environment 102. The architecture 100 also includes one or more electronic devices 110 with which a user may interact. As illustrated, one electronic device 110a is positioned within a room of environment 102. Other electronic devices 110b and 110c are positioned in other rooms of environment 102. In one example, the environment 102 might be the user's home or office. In other examples an environment might be a hotel, an automobile, or a public place such as a shopping mall. An environment may be an area or space in which the electronic devices can communicate with another device, such as a wireless access point. An environment also includes the area or space in which a user can communicate with or use the electronic devices.

Electronic device 110 may be placed in any number of locations (e.g., on a table, on the ceiling, wall, in a lamp, beneath a table, under a chair, etc.). Further, more than one electronic device 110 may be positioned in a single room, or as illustrated electronic devices may be used to accommodate user interactions from more than one room.

As described below in greater detail, electronic device 110 may communicate using wireless, such as Wi-Fi (IEEE 802.11), and/or BLUETOOTH (IEEE 802.15.1), and/or ZIGBEE (IEEE 802.15.4). These wireless technologies provide point-to-point communication between two endpoints. When communicating using Wi-Fi, electronic device 110 may connect with wireless access point 124, and wireless access point 124 may connect to the Internet using network 116. Portable wireless device 122 may also connect to wireless access point 124. In some implementations, portable wireless device 122 is a cellular portable wireless device, although it does not need to be a portable wireless device, and could be a tablet, or other device with wireless capability. Within environment 102, any or all of electronic devices 110a, 110b and 110c may connect with wireless access point 124 and may use that connection to communicate with each other. For shorter-range wireless communication, electronic device 110 may also use a BLUETOOTH connection with portable wireless device 122.

Referring to system 100 in FIG. 1, at (150) system 100, which includes multiple remote server(s) 120a, 120b, 120c, 120d receives a spoken utterance from electronic device 110a. The spoken utterance is from a user of the device and is to activate a function. In one implementation, the spoken utterance is to establish an inter-com like communication channel between electronic device 110a and 110b. For some functions, there are prerequisites, and before the inter-com like communication function can be activated, certain prerequisites must be satisfied. One of those prerequisites is that the user has acknowledged terms of use associated with the inter-com like communication function. In another implementation, the spoken utterance is to establish a voice call or message using electronic device 110a. Similar to the inter-com like communication function, certain prerequisites like acknowledging terms of use must be satisfied before the function is made available.

Generally, electronic device 110a has an associated user profile, and that user profile reflects information about the user, such as name, and features that are activated or available to the user. At (152) system 100 checks that user profile to determine that there the prerequisites associated with a requested function that are not yet satisfied. In one implementation, the prerequisites include user-acknowledged terms of use for the function. The prerequisites can be associated with electronic device 110a and/or with the user profile that is associated with electronic device 110a.

Where the prerequisites are not yet satisfied, at (154) system 100 sends data to electronic device 110a. The data sent at (154) represents a synthesized speech prompt asking the user to confirm that they want to set-up the function. The data sent at (154) also provides the terms of use, and may also include directions or a link to the terms of use. The data sent at (154) asks the user to confirm that they agree to the terms of use. The data sent at (154) is generally converted to synthesized speech by electronic device 110a, and provided to the user as a synthesized speech prompt.

When the user hears the synthesized speech prompt, the user provides a verbal acknowledgment of the terms of use, and at (156) that verbal acknowledgment is received by electronic device 110a. In one implementation, electronic device 110a converts that verbal user-acknowledgment into text and sends the text as data to system 100. In another implementation, electronic device 110a digitizes the verbal response and sends the digitized verbal response as digital data to system 100. Electronic device 110a may also convert the digitized speech to text, and send the text as data to system 100. At (156), the digitized speech representing the verbal acknowledgment of the terms of use and/or the corresponding text is sent from electronic device 110a to system 120. In this way, the digitized verbal acknowledgment itself, and/or data representing the verbal acknowledgment is received by system 100.

System 100 confirms that the received data, which may be the digitized verbal acknowledgment itself, and/or data representing the verbal acknowledgment corresponds to a verbal acknowledgment, such as "yes." System 100 associates that verbal acknowledgment with device 110a at (158). Device 110a is associated with a user profile, and that associated user profile is referenced at (160) when system 100 stores data representing the verbal acknowledgment in a persistent data store. The date and time associated with the verbal acknowledgment is also stored in the persistent data store. If the user changes the prerequisites that information is added to the persistent data store, with an associated date and time. The most current information in the data store can be identified by the associated data and time. This persistent storage can then serve as part of the audit trail to establish that as a prerequisite and before the requested function was made available for use, the user verbally acknowledged the terms of use, and there is an associated date and time of the verbal acknowledgment. Depending on the type of proof required, the digitized verbal acknowledgment may be stored, text corresponding to the digitized voice may be stored, or both may be stored in the persistent data store. The persistent data store may be storage that is part of system 100, or the persistent data store may be separate, but accessible to system 100. One aspect of the persistent data store is that it is associated with access rights that prevent the user from being able to erase the stored data. In one implementation and in addition to storing the digitized verbal acknowledgment at 160, the data associated with the prerequisites that was sent at 154, is also stored in the persistent data store and forms part of the audit trail.

At (162) data corresponding to the verbal acknowledgment of the terms of use is also stored in a user-erasable data store. In some implementations, a user may have the option to remove or otherwise delete all verbal communications and verbal interactions with electronic device 110a. If the user subsequently elects to remove or delete all their verbal communications and verbal interactions with electronic device 110a, then the data corresponding to the verbal acknowledgment that is stored at (162) will be removed. However, the data corresponding to the verbal acknowledgment that is stored at (160) in a persistent data store is not removed, even if the user elects to remove or delete all verbal communications and verbal interactions with electronic device 110a.

In one implementation, the data stored at (160) corresponds to responses that are stored monotonically, meaning a new response does not replace a previous response, it is simply added to the previous responses and the new response becomes the active or current response. For example, if the user has agreed to terms of use for a communication function, the data stored in a persistent data store may correspond to a positive response (e.g., yes) that the user agrees to the terms along with the date and time that they agreed. Similarly, if the user subsequently determines that they do not want that feature and want it removed, the data corresponding to that negative response (e.g., no) is stored in the persistent data store with an associated date and time. The earlier positive response and associated date/time is not removed, but it remains in the persistent data store along with the current negative response and its associated date/time.

Once the responses corresponding to the prerequisites have been stored, the requested function is activated at (164) and the user is able to take advantage of the requested function. As discussed, in one implementation the requested function might be to establish an inter-com like communication function. In another implementation, the requested function might be to establish a voice call or message using electronic device 110a.

Figure 2:
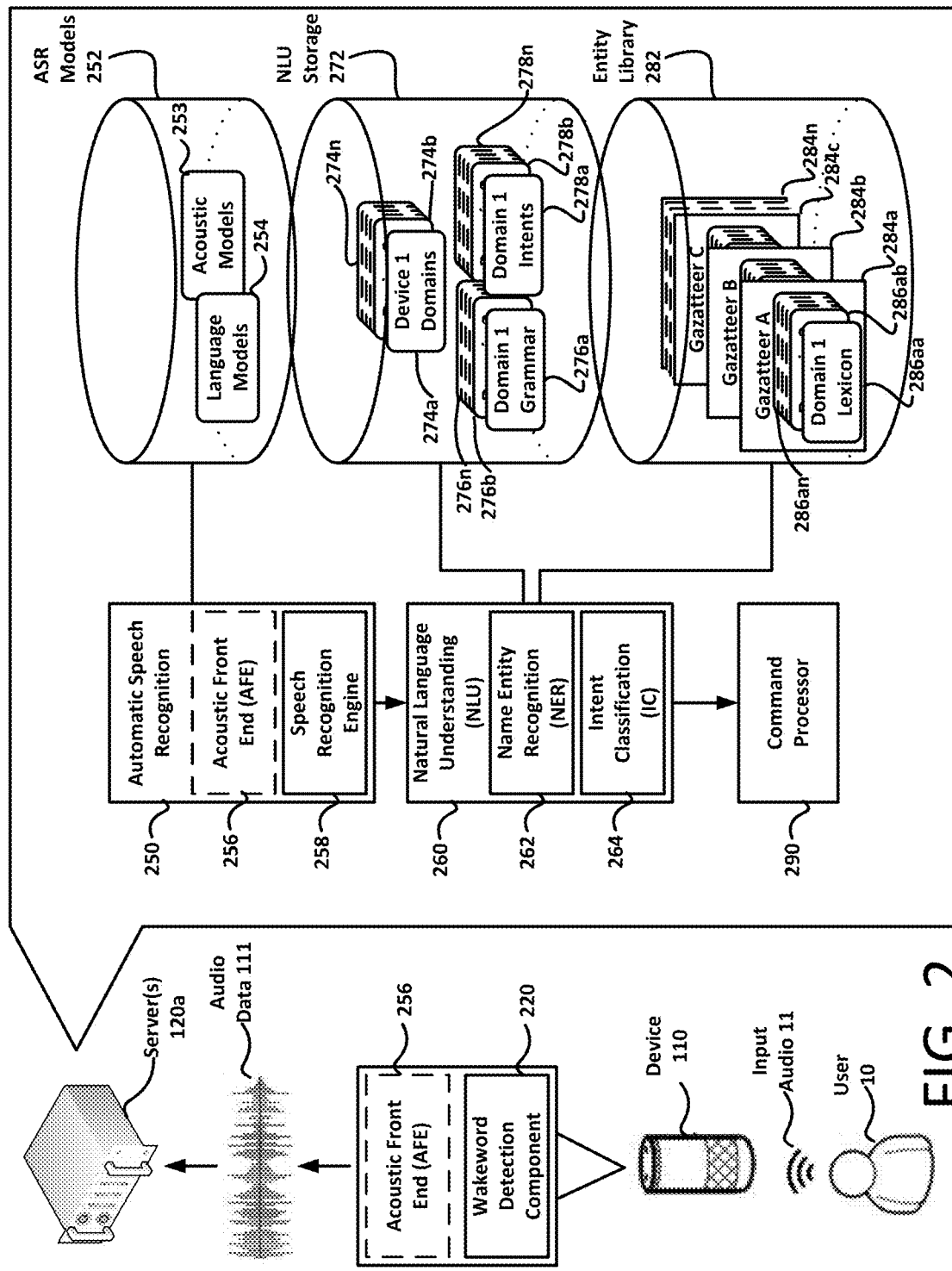
FIG. 2 illustrates an architecture for processing a spoken utterance.

The system 100 of FIG. 1 may operate using various speech processing components as illustrated in FIG. 2, and described herein. FIG. 2 is a conceptual diagram of how a spoken utterance is processed, allowing a system to capture and execute commands spoken by a user, such as spoken commands that may follow a wakeword. The various components illustrated may be located on a same or different physical devices. Communication between various components illustrated in FIG. 2 may occur directly or across network(s) 116. An audio capture component, such as microphone(s) 112 of device 110, captures audio 11 corresponding to a spoken utterance.

The device 110, using a wakeword detection component 220, then processes the audio 11, or audio data 111 corresponding to the audio 11, to determine if a keyword (such as a wakeword) is detected in the audio 11. Following detection of a wakeword, the device sends audio data 111 corresponding to the utterance, to a server(s) 120a that includes an ASR component 250. The audio data 111 may be output from an acoustic front end (AFE) 256 located on the device 110 prior to transmission. Or the audio data 111 may be in a different form for processing by a remote AFE 256.

The wakeword detection component 220 works in conjunction with other components of the device, for example microphone(s) 502 to detect keywords in audio 11. For example, the device 110 may convert audio 11 into audio data 111, and process the audio data 111 with the wakeword detection component 220 to determine whether speech is detected, and if so, if the audio data 111 comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio 11 received by the device 110 (or separately from speech detection), the device 110 may use the wakeword detection component 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 220 may compare audio data 111 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120a for speech processing. Audio data 111 corresponding to that audio 11 may be sent to a server(s) 120b for routing to a recipient device or may be sent to the server(s) 120a for speech processing for interpretation of the included speech (either for purposes of enabling voice-communications and/or for purposes of executing a command in the speech). The audio data 111 may include data corresponding to the wakeword, or the portion of the audio data 111 corresponding to the wakeword may be removed by the local device 110 prior to sending. Further, a local device 110 may "wake" upon detection of speech/spoken audio above a threshold, as described herein. Upon receipt by the server(s) 120a, an ASR component 250 may convert the audio data 111 into text. The ASR transcribes audio data 111 into text data representing the words of the speech contained in the audio data 111. The text data may then be used by other components for various purposes, such as executing system commands, inputting data, etc. In the various implementations described herein, the spoken utterance may acknowledge terms of user. A spoken utterance in the audio data 111 is input to a processor configured to perform ASR which then interprets the utterance based on the similarity between the utterance and pre-established language models 254 stored in an ASR model knowledge base (ASR Models Storage 252). For example, the ASR process may compare the input audio data 111 with models for sounds (e.g., subword units, phonemes, etc.) and sequences of sounds to identify words that match the sequence of sounds spoken in the utterance of the audio data 111.

An ASR process 250 converts the audio data 111 into text. The ASR transcribes audio data 111 into text data representing the words of the speech contained in the audio data 111. The text data may then be used by other components for various purposes, such as executing system commands, inputting data, etc. A spoken utterance in the audio data 111 is input to a processor configured to perform ASR which then interprets the utterance based on the similarity between the utterance and pre-established language models 254 stored in an ASR model knowledge base (ASR Models Storage 252). For example, the ASR process may compare the input audio data 111 with models for sounds (e.g., subword units or phonemes) and sequences of sounds to identify words that match the sequence of sounds spoken in the utterance of the audio data 111.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data 111. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data 111 from the microphone(s) 502 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values, called features, representing the qualities of the audio data 111, along with a set of those values, called a feature vector or audio feature vector, representing the features/qualities of the audio data 111 within the frame. Many different features may be determined, as known in the art, and each feature represents some quality of the audio 11 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage 252. Alternatively, post front-end processed data (such as feature vectors) may be received by the device executing ASR processing from another source besides the internal AFE 256. For example, the device 110 may process audio data 111 into feature vectors (for example using an on-device AFE 256) and transmit that information to a server across network(s) 116 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 116. For example, ASR results in the form of a single textual representation of the speech, an N-best list including multiple hypotheses and respective scores, lattice, etc. may be sent to a server, such as the server(s) 120a, for natural language understanding (NLU) processing, such as conversion of the text into commands for execution, either by the device 110, by the server(s) 120a, or by another device (such as a server running a search engine, etc.).

The device performing NLU processing 260 (e.g., server(s) 120a) may include various components, including potentially dedicated processor(s), memory, storage, etc. A device configured for NLU processing 260 may include a named entity recognition (NER) component 262, intent classification (IC) component 264, NLU storage 272 and a knowledge base (not shown). The knowledge base is a database or other information storage that may include information about entities that may be used in resolving user queries. The NLU process may also utilize gazetteer information (284a-284n) stored in entity library storage 282. The knowledge base and/or gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process 260 takes textual input (such as processed from ASR 250 based on the utterance 11) and attempts to make a semantic interpretation of the text. That is, the NLU process 260 determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process 260 may be configured to parse and tag to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server(s) 120a or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition component 262 receives a query in the form of ASR results and attempts to identify relevant grammars and lexical information that may be used to construe meaning. To do so, a name entity recognition component 262 may begin by identifying potential domains that may relate to the received query. The NLU storage 272 includes a database of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

In some examples, the device 110 may determine contextual information to assist with performing speech processing, such as a domain, based on the process operating when a voice command is received. For example, the device 110 may associate a first domain with a first feature group. When the device 110 receives a voice command while operating a first process corresponding to the first feature group, the device 110 may generate contextual information that indicates the first domain and/or other information and may associate the contextual information with the voice command.

A query may be processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains being ordinarily selected to be the correct result.

An intent classification (IC) component 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC component 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the query to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (in the NLU's storage 272). For instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the voice-controlled device "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server(s) 120a as part of the system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search query (for example, requesting the return of search results), the destination command processor 290 may include a search engine processor, such as one located on a search server, configured to execute a search command and determine search results, which may include output text to be processed by a TTS engine and output from a device as synthesized speech, such as announcements made with the pages described above.

Figure 3:
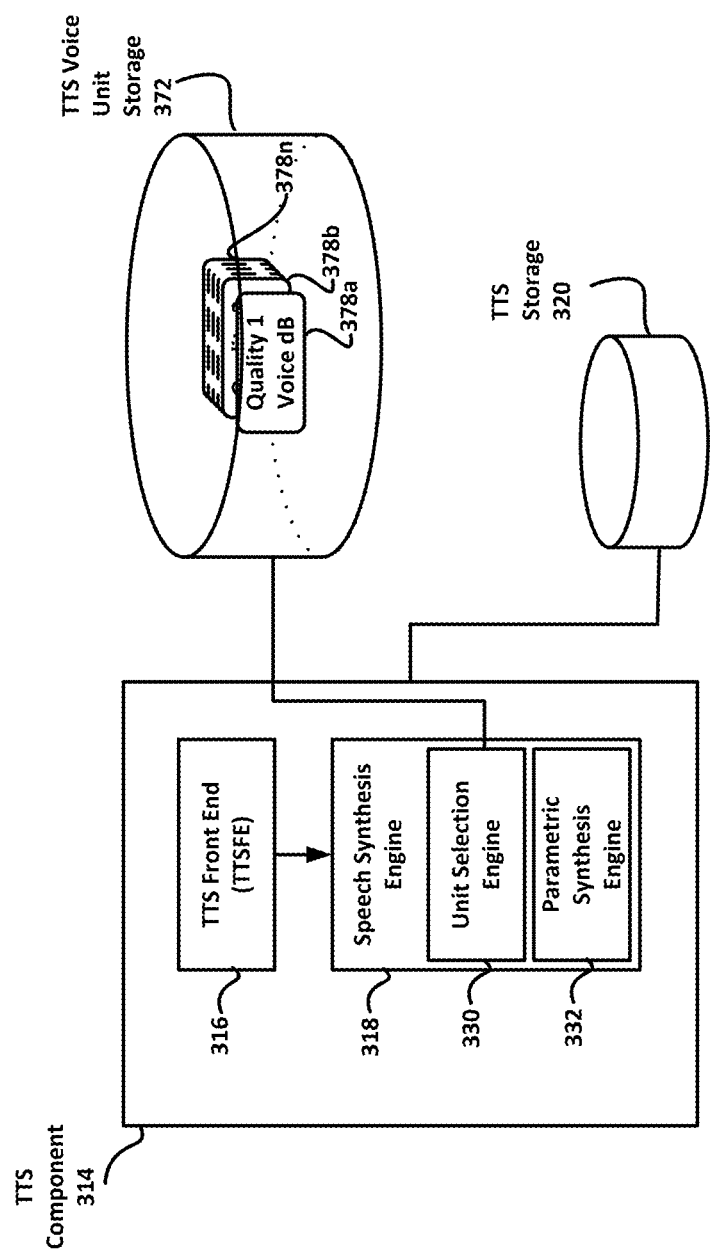
FIG. 3 illustrates examples of generating speech from text, or synthesized speech.

FIG. 3 illustrates an example of generating text-to-speech (TTS) or synthesized speech according to examples of the present disclosure. The TTS component/processor 314 includes a TTS front end (TTSFE) 316, a speech synthesis engine 318, and TTS storage 320. The TTSFE 316 transforms input text data (for example from command processor 290) into a symbolic linguistic representation for processing by the speech synthesis engine 318. The TTSFE 316 may also process tags or other data input to the TTS component that indicate how specific words should be pronounced (e.g., an indication that a word is an interjection). The speech synthesis engine 318 compares the annotated phonetic units models and information stored in the TTS storage 320 for converting the input text into speech. The TTSFE 316 and speech synthesis engine 318 may include their own controller(s)/processor(s) and memory or they may use the controller/processor and memory 604 of the server(s) 120a, device 110, or other device, for example. Similarly, the instructions for operating the TTSFE 316 and speech synthesis engine 318 may be located within the TTS component 314, within the memory and/or storage of the server(s) 120a, device 110, or within an external device.

Text input into a TTS component 314 may be sent to the TTSFE 316 for processing. The front-end may include components for performing text normalization, linguistic analysis, and linguistic prosody generation. During text normalization, the TTSFE processes the text input and generates standard text, converting such things as numbers, abbreviations (such as Apt., St., etc.), symbols ($, %, etc.) into the equivalent of written out words.

During linguistic analysis the TTSFE 316 analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. A TTS component 314 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 320. The linguistic analysis performed by the TTSFE 316 may also identify different grammatical components such as prefixes, suffixes, phrases, punctuation, syntactic boundaries, or the like. Such grammatical components may be used by the TTS component 314 to craft a natural sounding audio waveform output. The language dictionary may also include letter-to-sound rules and other tools that may be used to pronounce previously unidentified words or letter combinations that may be encountered by the TTS component 314. Generally, the more information included in the language dictionary, the higher quality the speech output.

Based on the linguistic analysis the TTSFE 316 may then perform linguistic prosody generation where the phonetic units are annotated with desired prosodic characteristics, also called acoustic features, which indicate how the desired phonetic units are to be pronounced in the eventual output speech. During this stage the TTSFE 316 may consider and incorporate any prosodic annotations that accompanied the text input to the TTS component 314. Such acoustic features may include pitch, energy, duration, and the like. Application of acoustic features may be based on prosodic models available to the TTS component 314. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information.

The output of the TTSFE 316, referred to as a symbolic linguistic representation, may include a sequence of phonetic units annotated with prosodic characteristics. This symbolic linguistic representation may be sent to a speech synthesis engine 318, also known as a synthesizer, for conversion into an audio waveform of speech for output to an audio output device and eventually to a user. The speech synthesis engine 318 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 318 may perform speech synthesis using one or more different methods. In one method of synthesis called unit selection, described further below, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 330 may match units to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis, parameters such as frequency, volume, noise, are varied by a parametric synthesis engine 332, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS component 314 may include an acoustic model, or other models, which may convert a symbolic linguistic representation into a synthetic acoustic waveform of the text input based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 316.

The parametric synthesis engine 332 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 318, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (ID), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Unit selection speech synthesis may be performed as follows. Unit selection includes a two-step process. First a unit selection engine 330 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 330. As part of unit selection, the unit selection engine 330 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 320, in storage 372, or in another storage component. For example, different unit selection databases may be stored in TTS voice unit storage 372. Each speech unit database includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 318 may attempt to select a unit in the speech unit database that most closely matches the input text (including both phonetic units and prosodic annotations). Generally the larger the voice corpus/ speech unit database the better the speech synthesis may be achieved by virtue of the greater number of unit samples that may be selected to form the precise desired speech output.

Audio waveforms including the speech output from the TTS component 314 may be sent to an audio output component, such as a speaker for playback to a user or may be sent for transmission to another device, such as another server(s) 120a/120b, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS component 314 may be configured to perform TTS processing in multiple languages. For each language, the TTS component 314 may include specially configured data, instructions and/or components to synthesize speech in the desired language(s). To improve performance, the TTS component 314 may revise/update the contents of the TTS storage 320 based on feedback of the results of TTS processing, thus enabling the TTS component 314 to improve speech recognition.

Other information may also be stored in the TTS storage 320 for use in speech recognition. The contents of the TTS storage 320 may be prepared for general TTS use or may be customized to include sounds and words that are likely to be used in a particular application. For example, for TTS processing by a global positioning system (GPS) device, the TTS storage 320 may include customized speech specific to location and navigation. In certain instances the TTS storage 320 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic(s) (such as speaking an interjection in an enthusiastic manner) as explained in other sections herein. The speech synthesis engine 318 may include specialized databases or models to account for such user preferences.

For example, to create the customized speech output of the system, the system may be configured with multiple voice corpuses/unit databases 378a-378n, where each unit database is configured with a different "voice" to match desired speech qualities. The voice selected by the TTS component 314 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterance may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice corpuses 378 may then be used during runtime to perform unit selection to synthesize speech having a speech quality corresponding to the input speech quality.

Figure 4:
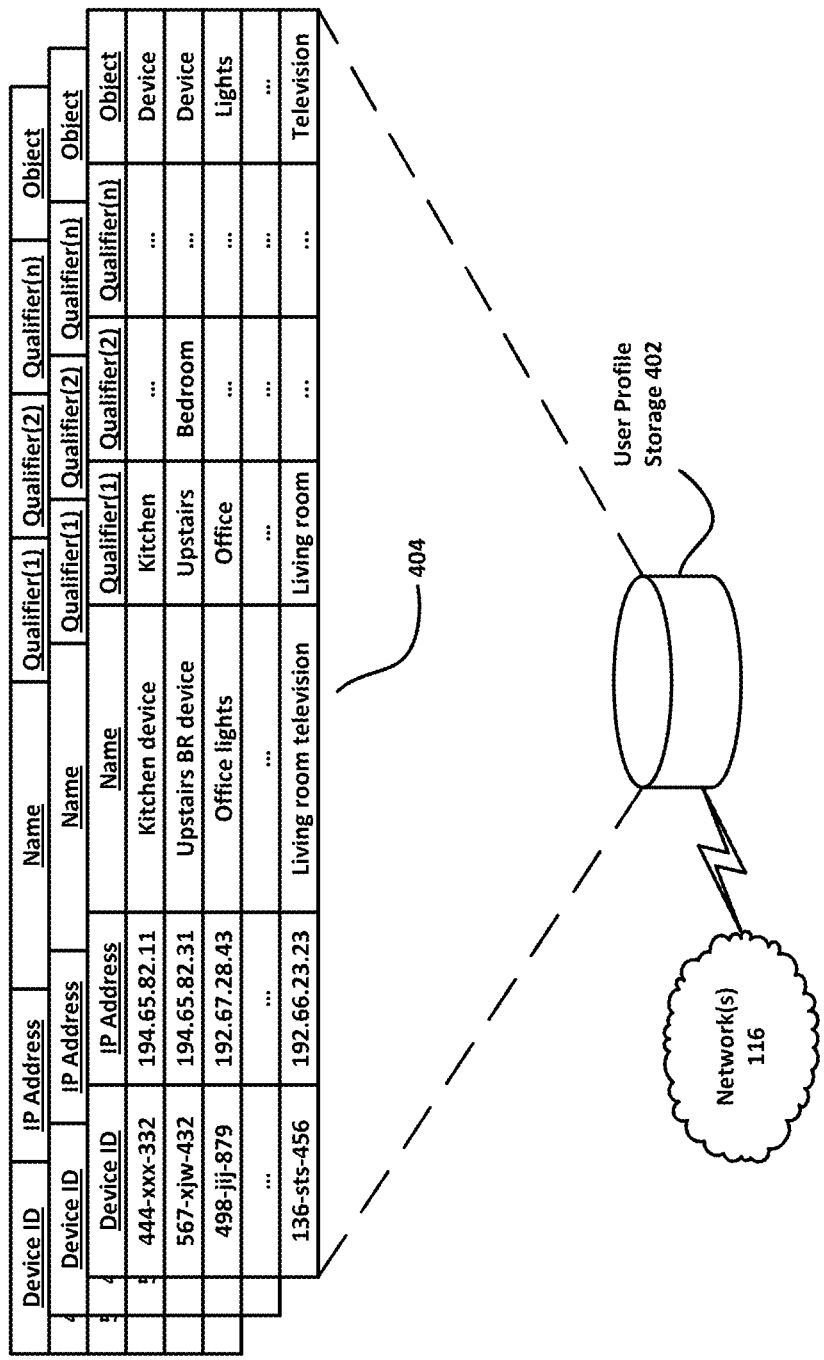
FIG. 4 illustrates examples of data stored and associated with user profiles.

The server(s) 120a/120b may include or refer to data regarding user accounts, shown by the user profile storage 402 illustrated in FIG. 4. The user profile storage 402 may be located proximate to server(s) 120a/120b, or may otherwise be in communication with various components, for example over network(s) 116. The user profile storage 402 may include a variety of information related to individual users, households, accounts, etc. that interact with the system 100. For illustration, as shown in FIG. 4, the user profile storage 402 may include data regarding the devices associated with particular individual user accounts 404. In an example, the user profile storage 402 is a cloud-based storage. Such data may include device identifier (ID) and internet protocol (IP) address information for different devices as well as names by which the devices may be referred to by a user. Data that represents the user-acknowledged terms of use that are stored at 160 and 162, are linked to the user profile for the individual user account 404. Further qualifiers describing the devices may also be listed along with a description of the type of object of the device.

Figure 5:
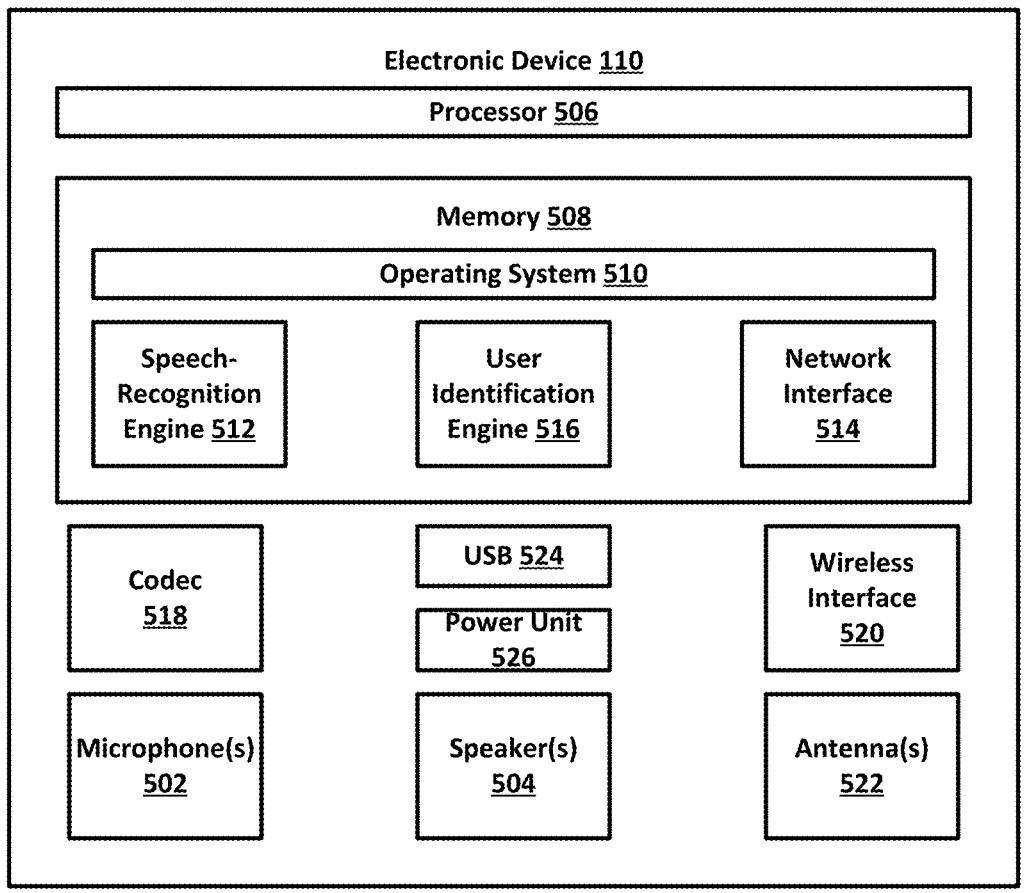
FIG. 5 illustrates a block diagram of selected functional components implemented in an electronic device.

As illustrated with respect to FIG. 5, electronic device 110 generally has at least one microphone 502 and at least one speaker 504 to facilitate user audio interactions. In some instances, electronic device 110 is implemented without physical input components (e.g., no keyboard, no keypad, no touch screen, no joystick, no control buttons, etc.). In some instances, a limited set of one or more physical input components may be employed (e.g., a dedicated button to initiate a configuration, power on/off, or a touch screen display, etc.). Nonetheless, a primary and potentially only mode of user interaction with electronic device 110 may be through voice input and audible output.

Microphone 502 of electronic device 110 detects audio from an environment 102, such as sounds uttered from a user. As illustrated, the electronic device 110 includes at least one processor 506 and memory 508, which stores or otherwise has access to a speech-recognition engine 512. As used herein, a processor may include multiple processors and/or a processor having multiple cores. The speech-recognition engine 512 performs speech recognition on audio captured by microphone 502, such as utterances spoken by a user. The electronic device 110 may perform certain actions in response to recognizing different speech from a user. The user may speak predefined commands (e.g., "Awake"; "Sleep"), or may use a more casual conversation style when interacting with electronic device 110 (e.g., "I'd like to go to a movie. Please tell me what's playing at the local cinema.").

In some instances, electronic device 110 may operate in conjunction with or may otherwise utilize system 100 that is remote from environment 102. For instance, electronic device 110 may couple to the system 100 over network 116. As illustrated, the system 100 may be implemented as one or more servers 120a, 120b, 120c, 120d, and may, in some instances form a portion of a network-accessible computing platform implemented as a computing infrastructure of processors, storage, software, data access, and so forth that is maintained and accessible via a network such as one including the Internet. System 100 does not require end-user knowledge of the physical location and configuration of the system that delivers the services.

Figure 6:
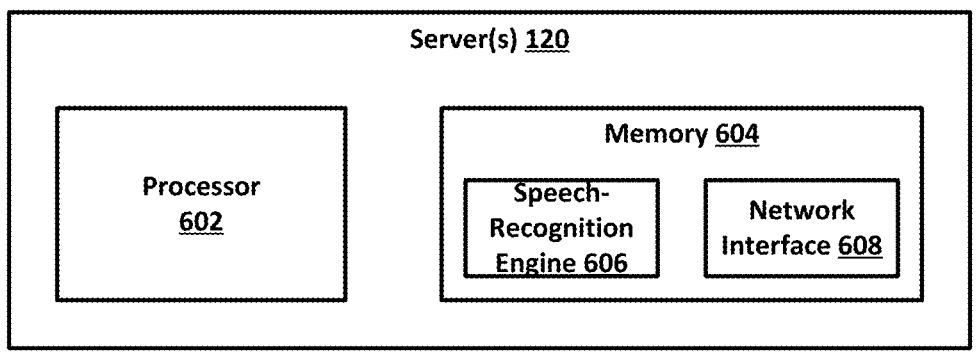
FIG. 6 illustrates a block diagram of selected functional components implemented in remote servers of the system.

As illustrated in FIG. 6, servers 120a-120d include at least one processor 602 and memory 604, which may store or otherwise have access to some or all of the components described with reference to memory 508 of the electronic device 110. For instance, memory 604 may have access to and utilize speech-recognition engine 512 or another speech recognition engine 606 for receiving audio signals from the electronic device 110, recognizing speech and, potentially, causing performance of an action in response. In some examples, the electronic device 110 may upload audio data to remote server(s) 120 of system 100 for processing, given that system 100 may have a computational capacity that far exceeds the computational capacity of the electronic device 110. Therefore, the electronic device 110 may utilize the speech-recognition engine 606 at remote server(s) 120a for performing relatively complex analysis on audio captured from environment 102.

Regardless of whether the speech recognition occurs locally or remotely from the environment 102, the electronic device 110 may receive vocal input from a user and either the electronic device 110 and/or the remote server(s) 120a may perform speech recognition to interpret a user's operational request or command. The requests may be for essentially any type of operation, such as database inquires, requesting and consuming entertainment (e.g., gaming, finding and playing music, movies or other content, etc.), personal management (e.g., calendaring, note taking, etc.), online shopping, financial transactions, telephone communication, and so forth.

The electronic device 110 and remote server(s) 120 of system 100 may communicatively couple to the network 116 via network interface 514 and network interface 608, respectively, using wired technologies (e.g., wires, USB, fiber optic cable, etc.), wireless technologies (e.g., WiFi, cellular, satellite, BLUETOOTH, etc.), or other connection technologies. The network 116 is representative of any type of communication network, including data and/or voice network, and may be implemented using wired infrastructure (e.g., cable, CAT5, fiber optic cable, etc.), a wireless infrastructure (e.g., RF, cellular, microwave, satellite, BLUETOOTH, etc.), and/or other connection technologies.

In addition to communicating with each other locally using access point 124, or over network 116, the electronic device 110 and remote server(s) 120 of system 100 may also each communicate with a cell carrier 121 over network 116 to enable telephone communication using the electronic device 110, or portable wireless device 122.

As illustrated, memory 508 of electronic device 110 also stores or otherwise has access to a user identification engine 516, which functions to identify a user that utters an audible command. When the user is audibly interacting with electronic device 110 it indicates that the user is physically present in the vicinity of the electronic device. Similarly, where electronic device 110 supports other forms of user interaction, such as with a keyboard, keypad, touch pad, touch screen etc, that user interaction also indicates that the user is physically present when making the interaction. Any of those interactions can be used to determine a presence indication that correlates the location of a user with respect to electronic device 110. When the user stops interacting, the likelihood that the user remains physically present decreases as time passes. This can also serve as a presence indication for that particular user. The presence indicator may reflect the last time the user was interacting with the electronic device, the length of time that the user interacted with the electronic device, in addition to details of how the user interacted with the electronic device (e.g. what they did, what they heard, what they said etc.).

Where electronic device 110 also includes an imaging capability or camera and a user interacts with electronic device 110 using that image capability, then a user presence indicator can also consider when and where the user was most recently seen, and associate the location of that particular electronic device 110 as a user presence indicator.

Upon receiving audio within environment 102, the speech-recognition engine 512 may first attempt to identify whether or not the audio contains speech, such as speech from a user. If so, then the speech-recognition engine 512 may perform automatic speech recognition (ASR) on the audio and may perform an action corresponding to any command from the audio.

In certain implementations, a user may want an incoming call to portable wireless device 112 to be routed to one of electronic devices 110a, 110b, or 110c, so they can participate in the call using one of electronic devices 110a, 110b, or 110c, instead of having to use portable wireless device 112. This function or feature has prerequisites that must be satisfied before the user can use the function. One of the prerequisites is agreement to terms of service or use. Once the user has verbally acknowledged those terms of service or use, then when an incoming call is being signaled by portable wireless device 122, and that incoming call is announced through electronic devices 110a, 110b and 110c, a user may issue a verbal command requesting that the electronic device 110 answer the incoming phone call. As such, the speech-recognition engine 512 may identify this verbal command and the electronic device 110 answers the incoming call. Answering the incoming call includes establishing a communication session, where the call audio is sent between the two devices during the communication session.

The electronic device 110 may also output a response before performing the speech recognition. For instance, electronic device 110 may output an indication that a call to portable wireless device 122 is being received, and electronic device 110 may verbally identify the caller, or calling number. Where a contact database is available, electronic device 110 may locate additional information related to the caller, using the calling number or other parts of the caller id. That additional information may be included when electronic device 110 verbally announces the call.

Similarly, electronic device 110 may output a response after performing the speech recognition to indicate that the device will comply with the request, with this indication being audible, visual, or the like. For instance, the electronic device 110 audibly outputs a response indicating that the electronic device 110 will answer the phone call as requested. In these examples, the audible response may include the caller's name, which may be extracted from caller ID information.

Similar to use of portable wireless device 122 and electronic device 110 to make and receive calls, electronic device 110a may be used to communicate with electronic device 110b much like an intercom. However, before the user can activate that feature or function, they must verbally agree to certain terms of service or use.

FIG. 5 shows selected functional components of electronic device 110 in more detail. Generally, electronic device 110 may be implemented as a standalone device that is relatively simple in terms of functional capabilities with limited input/output components, memory and processing capabilities. For instance, electronic device 110 does not typically have a physical input, such as no keyboard, no keypad, or other form of mechanical input. Further, it typically does not have a display or touch screen to facilitate visual presentation and user touch input. Instead, electronic device 110 may be implemented with the ability to receive and output audio, a network interface (wireless or wire-based), power, and limited processing/memory capabilities. However, electronic device 110 is not limited to only audible input and output, and a display or touch screen, or other physical input capability is also possible in addition to audio input and output.

As illustrated in FIG. 5, electronic device 110 includes at least one processor 506 and memory 508. Memory 508 may include computer-readable storage media ("CRSM"), which may be any available physical media accessible by processor 506 to execute instructions stored on the memory. CRSM may include random access memory ("RAM") and Flash memory. CRSM may also include, but is not limited to, read-only memory ("ROM"), electrically erasable programmable read-only memory ("EEPROM"), or any other medium which can be used to store the desired information and which can be accessed by the processor 506. Memory 508 also includes operating system 510, which serves to implement most of the desired functions using processor 506.

Electronic device 110 includes one or more microphones 502 to receive audio input, such as user voice input, and one or more speakers 504 to output audio. A codec 518 is coupled to microphone 502 and speaker 504 to encode and/or decode the audio signals. The codec may convert audio data between analog and digital formats. A user may interact with the electronic device 110 by speaking to it, and the microphone 502 captures the user speech. The codec 518 encodes the user speech and transfers that audio data to other components. The electronic device 110 can communicate back to the user by emitting audible statements through speaker 504. In this manner, the user can interact with the device using speech, without use of a keyboard or display common to other types of electronic devices.

In the illustrated example, the electronic device 110 includes a wireless interface 520 coupled to one or more antenna 522 to facilitate a wireless connection to a network. The wireless interface 520 may implement one or more of various wireless technologies, such as Wi-Fi, BLUETOOTH, ZIGBEE, and so on.

The electronic device 110 may also include one or more device interfaces 524 to facilitate a wired connection to a network, or a plug-in network device that communicates with other wireless networks. The device interfaces 524 may comprise a USB port and/or other forms of wired connections such as a broadband connection. A power unit 526 is further provided to distribute power to the various components on electronic device 110.

The electronic device 110 is designed to support audio interactions with the user, in the form of receiving voice commands (e.g., words, phrase, sentences, etc.) from the user and outputting audible feedback to the user. Accordingly, as illustrated, there are no physical input devices, such as navigation buttons, keypads, joysticks, keyboards, touch screens, and the like. Further there is no display for text or graphical output. The electronic device 110 may include non-input control mechanisms, such as basic volume control button(s) for increasing/decreasing volume, as well as power and reset buttons. There may also be a light element (e.g., LED) to indicate a state such as, for example, when power is on or to provide a notification to the user. As an example, the LED may be illuminated with a particular color or pattern to indicate there is an incoming call. But, otherwise, the electronic device 110 typically does not use or need to use input devices or displays.

Instructions, datastores, and so forth may be stored within memory 508 and configured to execute on the processor 506. An operating system module 510 is configured to manage hardware and services (e.g., wireless unit, USB, Codec) within and coupled to the electronic device 110 for the benefit of other modules.

In addition, memory 508 may include the speech-recognition engine 512, the user identification engine 516, and the network interface 514 discussed above. Also as discussed above, some or all of the engines, data stores, and components may reside additionally or alternatively in remote server(s) 120 of system 100.

Electronic device 110 may be used for both inbound and outbound communications. Those communications include audio and video, synchronous and asynchronous communications. Those communications also include text messaging, video messaging, and picture messaging. In one example, a wireless communication to a user is received by portable wireless device 122. The communication may be received while the portable wireless device is with the user at home (environment 102) or while the portable wireless device is at another location that includes an electronic device 110. For any number of reasons, the user may wish to answer and conduct the incoming call using electronic device 110, instead of using portable wireless device 122. For example, portable wireless device 122 may be across the room, and not within reach. Or, the user may be cooking and otherwise have their hands occupied making it difficult to use portable wireless device 122.

In most instances, portable wireless device 122 includes an operating system that provides the main program for operation of the device. In addition, various software applications can be installed and operate on portable wireless device 122. These applications provide additional functionality to the portable wireless device. Portable wireless device 122 may include such an application that is specifically developed to support and enhance the interaction between portable wireless device 122, electronic devices 110 and remote server(s) 120 of system 100. In some instances, the application indicates that portable wireless device 122 and a user of the portable wireless device also has access to and uses electronic devices 110. The application may include identification information for one or more of those electronic devices 110, and the application may facilitate many of the interactions described herein.

Where there are multiple electronic devices 110 in the environment, such as environment 102, determining which particular electronic device 110 should be the audio interface to the user may not be immediately apparent. In one implementation, a BLUETOOTH connection between portable wireless device 122 and electronic device 110 is used to pass signals for the communication. Thus in a similar manner, determining which particular electronic device 110 should connect to portable wireless device 122 using BLUETOOTH may not be immediately apparent.

Before there can be any coordinated communication between portable wireless device 122 and electronic device 110, each may undergo an initial setup process, and then once that initial setup has been completed, there may be a subsequent registration process, such as when the device is powered up, or enters a new environment. For portable wireless device 122, the initial setup may include associating a user identity with the particular portable wireless device, associating a telephone number with the portable wireless device, and associating hardware identification of the portable wireless device with the user account. The hardware identification of the portable wireless device may include MAC addresses for 802.11 radios in the portable wireless device, and MAC addresses for BLUETOOTH radios in the portable wireless device.

The setup for electronic device 110 similarly may associate certain user identification with a particular electronic device 110, or it may include associating multiple electronic devices with one or more user identities. MAC addresses for 802.11 radios in the device, and MAC addresses for BLUETOOTH radios in the device may also be associated with the user identity.

The BLUETOOTH protocol (IEEE 802.15.1 and the Bluetooth Special Interest Group—SIG) describes the pairing and subsequent connection of two BLUETOOTH devices. Pairing of two devices may require some level of user interaction before the two devices can be connected for communication. Once the two BLUETOOTH devices are paired, then they may automatically connect without further user interaction. For this reason, it may be appropriate to initially pair portable wireless device 122 with one or more electronic devices 110 using BLUETOOTH. In this way, each obtains identifying information about the other that can be used for subsequent communication and connection.

FIG. 7A illustrates an architecture for implementing communication and messaging functionality. This also includes an intercom-like communication channel between multiple electronic devices. Remote server 120b communications with command processor 290 of remote server 120a, and includes hardware and software components to handle functions such as registration, set-up and break-down of communications and messaging aspects. Databases and data stores to support those functional components of the communication and messaging functionality are part of or accessible to remote server 120b. Implementations of the data bases and data stores include communications and messaging registration, as well as communications and messaging actions. Remote server 120b communicates with other remote server(s) 120 of system 100 using network 116.

Remote server 120b maintains information on prerequisites that may be needed before activation of a function, whether those prerequisites can be provided by a verbal utterance, whether the prerequisites need to be maintained for audit purposes, and therefore saved in a persistent data store, and whether there are any restrictions on a particular user that can agree to the prerequisites. For example, a user may restrict agreement to terms and conditions to the primary account holder, and not allow any other user to verbally agree to terms and conditions. Alternatively, regardless of whether the primary account holder has approved others to make changes, the function may be restricted and may not allow any user other than the primary account holder to agree to certain terms and conditions. Remote server 120b will also maintain information on electronic confirmations that may be required or optional whenever prerequisite information changes. For example if all users are allowed to agree to terms and conditions, a primary account holder may ask that they get an e-mail confirmation of all changes so they can verify or reverse those changes. All of that information is checked when a user asks to activate a function, and the prerequisites are not found in the user profile.

FIG. 7B illustrates an architecture for implementing storage functionality for user interactions. The user interactions include verbal interactions with system 100, as well as non-verbal interactions. Some of the user interactions are stored as text that represents a verbal utterance or other form of interaction. Other user interactions are stored as digitized speech that represents a user's verbal utterance or interaction with system 100. There may be implementations where all or most of a user's verbal utterances or interactions with system 100 are maintained in a data store that will be erased if the user makes such a request. Server 120c of system 100 provides storage functionality for those user verbal utterances or interactions. The user erasable storage 714, which is part of or accessible to remote server 120c, implements some of the storage function. Storage 714 might provide text storage, and or storage of digitized speech. However, this type of user-erasable storage may not satisfy audit requirements, particularly where a user's acknowledgment or agreement to terms of service must be maintained. To provide support for audit requirements and for other purposes, a persistent data store 712 is also provided. Persistent storage 712 may provide text storage, and or storage of digitized speech. Unlike the user erasable storage of 714, the persistent storage of 712 is not erased or otherwise deleted when a user makes a request to delete or remove all of their verbal utterances, or interactions. Like remote server 120b, remote server 120c also communicates with other remote servers of system 100 using network 116. Although remote server 120c is illustrated and described as distinct from remote server 120a, the features and functions of remote server 120c may be part of or included within the features and functions of remote server 120a, and there may not be a separate server 120c.

Although persistent storage 712 of remote server 120c is not erased when a user makes a request, it is envisioned that persistent storage 712 can be accessed, edited, or deleted with appropriate system administrative privileges.

Figure 8:
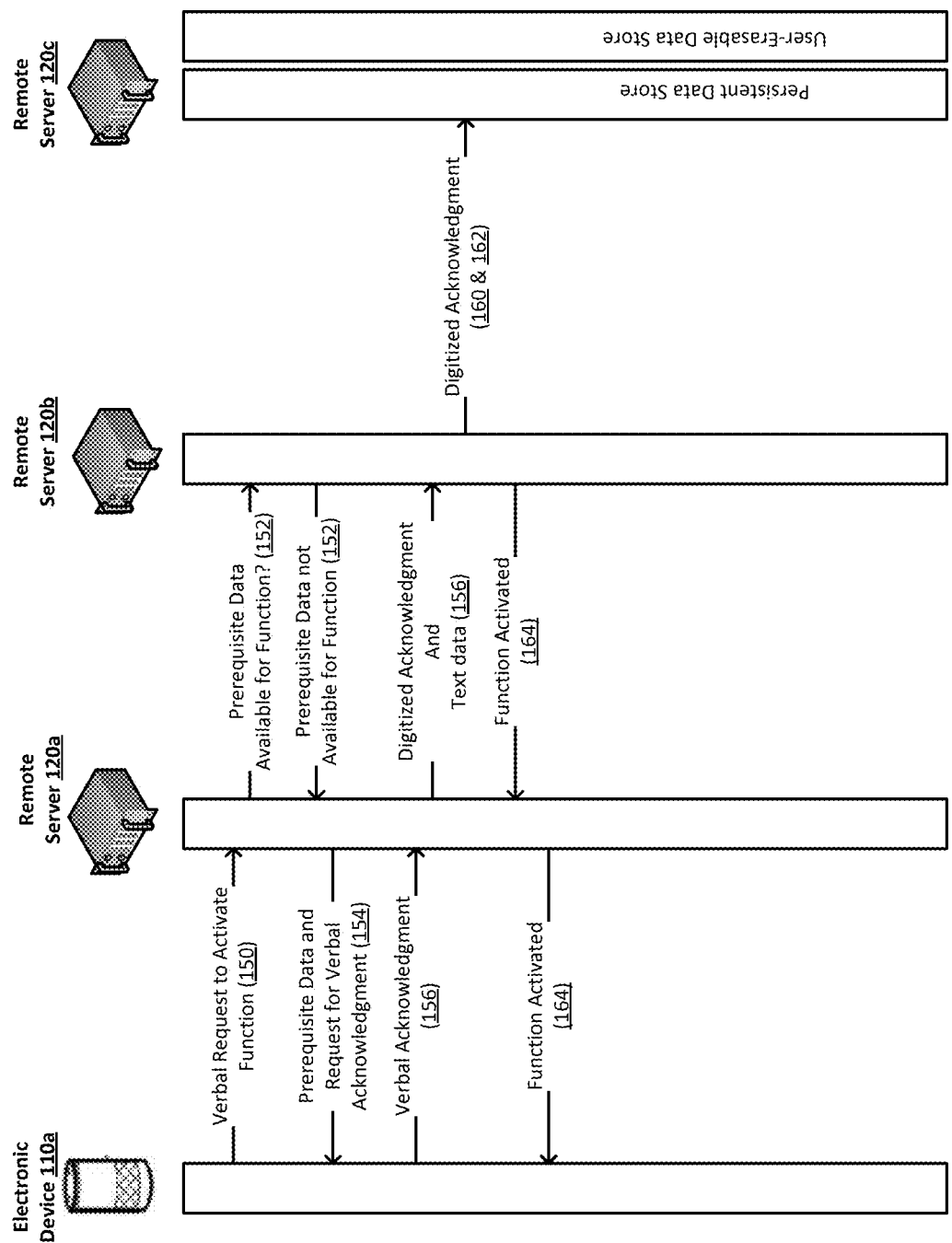
FIG. 8 illustrates signal processing by components as implemented in remote servers of the system.

FIG. 8 illustrates signal and communication between electronic device 110 and system 100, with remote server(s) 120a, 120b and 120c, as implemented in FIG. 1. In FIG. 8, remote server 120a of system 100 is primarily responsible for speech processing, including speech recognition and text to speech. Most of the features illustrated in FIG. 3 are implemented in remote server 120a. Remote server 120b of system 100 has responsibility for handling aspects related to prerequisites necessary for implementing functions, and remote server 120c of system 100 is primarily responsible for storing user interactions, which includes storing user-acknowledgment of the prerequisites. Persistent data stores 712, and user-erasable data stores 714 are part of or accessible to remote server 120c and system 100.

Similarly numbered actions in FIG. 8 and FIG. 1 describe the same or similar actions. A user provides a spoken utterance, such as a request to activate a particular function or feature, and at (150), electronic device 110 sends that spoken utterance to remote server 120a. The feature the user wants to active might be related to communication/messaging, or it might be related to an intercom-like communication channel between multiple electronic devices 110. The feature or function has associated prerequisites that must be satisfied before it is activated for that user. One of those prerequisites is that the user has acknowledged terms of use associated with the inter-com like communication function. In another implementation, the spoken utterance is to establish a voice call or message using electronic device 110a. Similar to the inter-com like communication function, certain prerequisites like acknowledging terms of use must be satisfied before the function is made available.

Electronic device 110a has an associated user profile, and that user profile reflects information about the user, such as name, and features that are activated or available to the user. The prerequisites can be associated with electronic device 110a and/or with the user profile that is associated with electronic device 110a. Remote server 120a receives the spoken utterance and at (152) sends a query to remote server 120b to determine whether the prerequisites for the function have been satisfied for the electronic device and associated user profile. A response to the query from remote server 120b indicates that the prerequisites for the function are not satisfied.

Because the prerequisites are not yet satisfied, at (154) remote server 120a sends data associated with the prerequisites to electronic device 110a. The data sent to electronic device 110a at (154) represents a synthesized speech prompt asking the user to confirm that they want to set-up the function. The data sent at (154) also provides the terms of use, and may also include directions or a link to the terms of use. The data sent at (154) asks the user to confirm that they agree to the terms of use. The data sent at (154) is generally converted to synthesized speech by electronic device 110a, and provided to the user as a synthesized speech prompt.

When the user hears the synthesized speech prompt, the user provides a verbal acknowledgment of the terms of use, and at (156) that verbal acknowledgment is received by electronic device 110a. In one implementation, electronic device 110a converts that verbal user-acknowledgment into text and sends the text as data to system 100. In another implementation, electronic device 110a digitizes the verbal response and sends the digitized verbal response as digital data to system 100. By digitizing the verbal response, the speaker of the verbal response may be identified using voice recognition. That can also assist with the audit trail. Electronic device 110a may also convert the digitized speech to text, and send the text as data to system 100. At (156), the digitized speech representing the verbal acknowledgment of the terms of use and/or the corresponding text is sent from electronic device 110a to system 100. In this way, the digitized verbal acknowledgment itself, and/or data representing the verbal acknowledgment is received by system 100.

System 100 confirms that the received data, which may be the digitized verbal acknowledgment itself, and/or data representing the verbal acknowledgment corresponds to a verbal acknowledgment, such as "yes." System 100 associates that verbal acknowledgment with device 110a. Device 110a is associated with a user profile, and that associated user profile corresponding to device 110a is referenced at (160) when system 100 stores data representing the verbal acknowledgment in a persistent data store. The date and time associated with the verbal acknowledgment is also stored in the persistent data store. This persistent storage can then serve as part of the audit trail to establish that as a prerequisite and before the function was made available for use, the user verbally acknowledged the terms of use, and there is an associated date and time of the verbal acknowledgment. Depending on the type of proof required, the digitized verbal acknowledgment may be stored, text corresponding to the digitized voice may be stored, or both may be stored in the persistent data store. The persistent data store may be storage that is part of system 100, or the persistent data store may be separate, but accessible to system 100. In one implementation, the persistent data store and user erasable data store are parts of or directly accessible to remote server 120c. In other implementations, the persistent data store and user erasable data store are parts of or directly accessible to remote server 120a or 120b.

One aspect of the persistent data store is that it is associated with access rights that prevent the user from being able to erase the stored data. In one implementation and in addition to storing the digitized verbal acknowledgment at 160, the data associated with the prerequisites that was sent at 154, is also stored in the persistent data store and forms part of the audit trail.

At (162) data corresponding to the verbal acknowledgment of the terms of use is also stored in a user-erasable data store. In some implementations, a user may have the option to remove or otherwise delete all verbal communications and verbal interactions with electronic device 110a. If the user subsequently elects to remove or delete all their verbal communications and verbal interactions with electronic device 110a, then the data corresponding to the verbal acknowledgment that is stored at (162) will be removed. However, the data corresponding to the verbal acknowledgment that is stored at (160) in a persistent data store is not removed, even if the user elects to remove or delete all verbal communications and verbal interactions with electronic device 110a.

In one implementation, the data stored at (160) corresponds to responses that are stored monotonically, meaning a new response does not replace a previous response, it is simply added to the previous responses and it becomes the active or current response. For example, if the user has agreed to terms of use for a communication function, the data stored in a persistent data store may correspond to a positive response (e.g., yes) that the user agrees to the terms, the date and time that they agreed is also stored. Similarly, if the user subsequently determines that they do not want that feature and want it removed, the data corresponding to that negative response (e.g., no) is stored in a persistent data store with an associated date and time. The earlier positive response and associated date/time is not removed, but it remains along with the current negative response and its associated date/time.

Once the prerequisites have been satisfied for the requested function, and the responses corresponding to the prerequisites have been stored, the requested function is activated at (164) and the user is able to take advantage of the requested function. As discussed, in one implementation the requested function might be to establish an inter-corn like communication function. In another implementation, the requested function might be to establish a voice call or message using electronic device 110a.

In addition to the verbal acknowledgment and persistent storage of the acknowledgment, in one implementation, a separate electronic communication or other form of confirmation, such as an e-mail, is sent to the user. This can serve as a confirmation of the verbal acknowledgment. The electronic communication can also provide additional details on the terms of service. This can be helpful where the terms of service provided in the electronic communication provide more detail than can be easily provided in synthesized speech.

Figure 9:
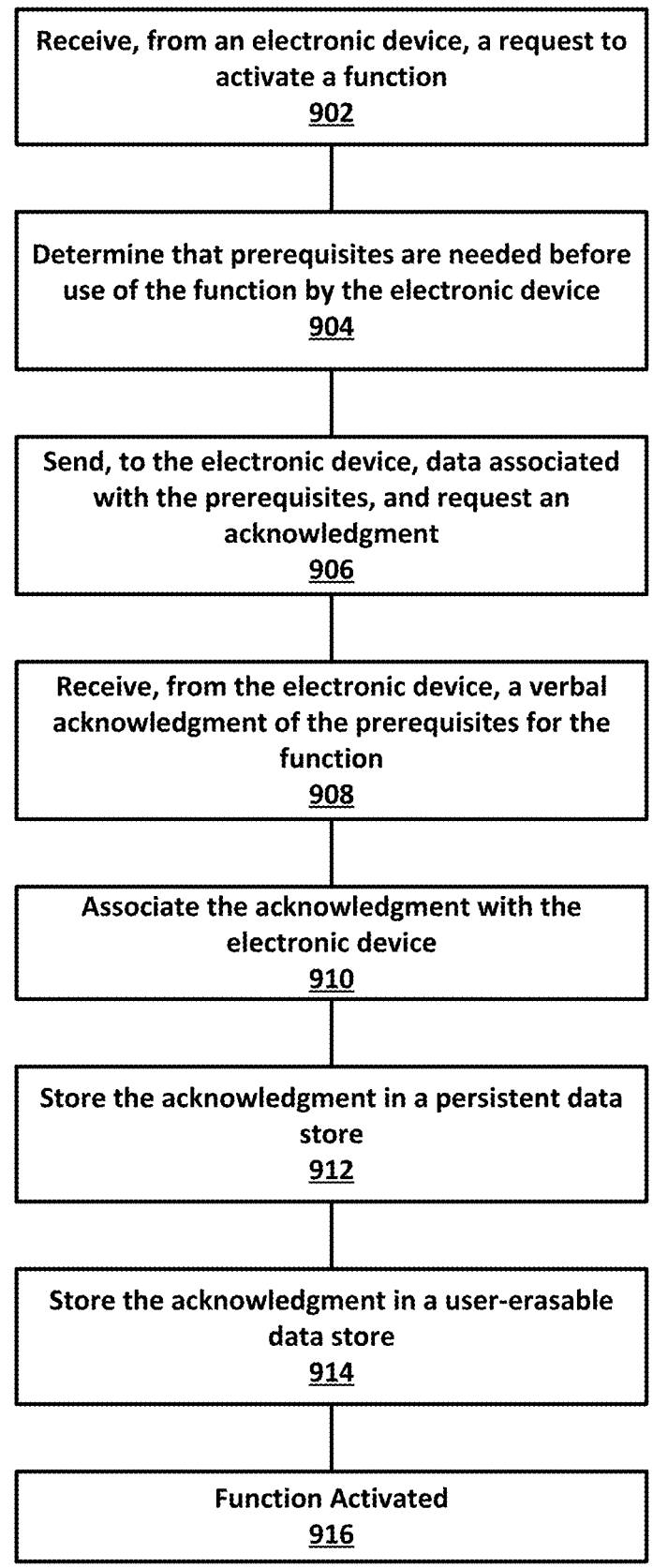
FIG. 9 shows an illustrative process of an implementation for determining whether a user has acknowledged the terms of use for a function, and if not, prompting and receiving a verbal acknowledgment for those terms of use from the user.

FIG. 9 illustrates one implementation for determining whether a user has acknowledged the terms of use for a function, and if not, prompting and receiving a verbal acknowledgment for those terms of use from the user. A user makes a spoken utterance to activate a function on electronic device 110a. The spoken utterance might be for many different types of functions. In at least one implementation, the function is to establish an inter-corn like communication channel between electronic device 110a and 110b. In this implementation, the request might be something like: "Alexa, drop in on the kitchen." In other implementations, the function might be related to calling or messaging. In those implementations, the request might be something like: "Alexa, call Mike at his office."

The request is sent at 902 from electronic device 110a to remote server 120a of system 100, where the request is received. The request may be in the form of digitized speech or the verbal request may be converted to text by electronic device 110a, and the text sent as data representing the verbal request.

At 904, system 100 determines that electronic device 110a has no associated record of a user-acknowledgment of terms of use for the function. In some implementations, this is accomplished by checking the user profile 404 that is associated with electronic device 110a. In some implementations, this may occur for the initial or first time that the user requests activation of the function. It could also occur when the terms of use have changed and the user must acknowledge those changed terms of use.

At 906, system 100 sends data that is associated with the terms of use to electronic device 110a. In some implementations, this includes informing the user that the full terms of use are available elsewhere for review and providing instruction on where to locate the full terms of use. In other implementations, the terms of use or a link to the terms of use may be sent to an e-mail or text address associated with the user. At 906, system 100 also sends a request to electronic device 110a, where the request is for a user-acknowledgment of the terms of use. For example, at 906 system 100 might cause electronic device 110a to verbally announce something like: "You have asked to activate the Drop In function, but that function is not enabled yet. When the Drop In function is enabled, you can connect to other household members for an instant voice chat. Terms for use of the Drop In function are available on the Alexa app. Should I enable the Drop In function?"

When the user agrees to the terms of use, at 908 they verbally acknowledge their agreement, and that verbal acknowledgment is received by electronic device 110a, where it is digitized and sent to system 100 as digitized voice, or the speech is converted to text, and the text is sent to system 100 as text data. As an example of the user-acknowledgment and agreement, the user might say: "Yes, please enable the Drop In function."

The user-acknowledgment is received by system 100 and at 910, that user-acknowledgment is associated with electronic device 110a and the user profile. Although not illustrated, system 100 activates the requested function, and provides any associated or necessary data to electronic device 110a.

In some implementations, a user of electronic device 110a may instruct system 100 to delete or otherwise remove all verbal communications or other forms of interactions. The communications or interactions at 902, 904, 906 and 908 are all part of the verbal communication and interaction between the user and electronic device 110a, and as such they are all subject to being deleted. However, for audit purposes, it may be necessary to retain a record of the user acknowledgment, even after all verbal communications or interactions are removed or deleted. For this and other reasons, at 912, the user-acknowledgment is stored in a persistent data store, and available for audit purposes. The user-acknowledgment stored at 912 may be a digitized representation of the verbal response from the user. It may also include text or other forms of data corresponding to the verbal response. Typically, it will also include a date and time that the user provided the verbal response. All of this can serve as part of the audit trail.

One aspect of the persistent data store is that it is associated with access rights that prevent the user from being able to erase the stored data. In one implementation and in addition to storing the digitized verbal acknowledgment at 912, the data associated with the prerequisites that was sent at 906, is also stored in the persistent data store and forms part of the audit trail.

At 914, the user-acknowledgment is also stored with other user verbal communications and interactions. In the event that the user instructs system 100 to delete or remove all verbal communications or interactions, then the acknowledgment stored at 914 could be deleted or removed along with other user verbal communications and interactions.

At 916, the requested function is activated and the user is able to take advantage of the requested function. As discussed, in one implementation the requested function might be to establish an inter-com like communication function. In another implementation, the requested function might be to establish a voice call or message using electronic device 110a.

In the implementations described, the verbal acknowledgment is primarily a yes/no response. However, there may be other instances where additional verbal acknowledgments, instructions, or confirmations are received and stored in a persistent storage for audit purposes. Examples might include an order history, music subscription services, video subscription services, or password changes.

The implementations have been primarily related to verbal acknowledgments. However, the system and methods described would also apply to persistent storage of touch-based or gesture-based acknowledgments. These touch-based or gesture-based acknowledgments might store information related to the device that received the touch or gesture (e.g., MAC address, or other identifying information) and might also include data related to biometrics of the user making the touch-based or gesture-based acknowledgment.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving first audio data from a user device, the first audio data representing a first spoken utterance to activate communications functionality provided by a system located remotely from the user device;
    determining that an agreement to terms and conditions associated with the communications functionality is required and that a user profile indicates the terms and conditions have yet to be agreed to by a user associated with the user profile;
    determining text data representing the terms and conditions;
    generating second audio data using text to speech (TTS) processing and the text data, the second audio data being synthesized representing the terms and conditions and requesting an indication that the user agrees to the terms and conditions;
    sending the second audio data to the user device;
    receiving third audio data from the user device, the third audio data representing a second utterance that corresponds to the agreement to the terms and conditions;
    storing the third audio data in a first data store, the first data store being erasable in response to a user request to erase data;
    storing the third audio data in a second data store, the second data store associated with access rights preventing the user from being able to erase the third audio data;
    storing the text data in the second data store, the second data store associated with access rights preventing the user from being able to erase the text data;
    associating fourth data with the user profile, the fourth data representing the agreement to the terms and conditions associated with the communications functionality; and
    activating the communications functionality for devices associated with the user profile.

2. The computer-implemented method of claim 1, further comprising:
    determining, based at least on the user profile that the communications functionality needs to be activated;
    determining that the agreement to the terms and conditions is not presently associated with the user profile;
    determining that an utterance is a permitted form of acknowledgment for the agreement to the terms and conditions; and
    determining that the communications functionality requires storage, that is associated with access rights preventing the user from being able to erase the agreement to the terms and conditions.

3. The computer-implemented method of claim 1, further comprising:
    generating second text data from the third audio data, the second text data corresponding to the agreement to the terms and conditions; and
    storing the second text data and the third audio data in the second data store associated with access rights preventing the user from being able to erase the second text data.

4. The computer-implemented method of claim 1, further comprising:
    storing, in the second data store associated with access rights, the third audio data as digitized speech that allows speaker identification based on voice recognition.

5. A computing system comprising:
    at least one processor;
    at least one first data store;
    at least one second data store; and
    memory including computer instructions, that upon execution by the at least one processor, cause the computing system to:
        determine that prerequisite information related to use of a function is needed;
        send first audio data to a device, the first audio data including a description of the prerequisite information and requesting a user utterance agreeing to the prerequisite information;
        receive second audio data representing the user utterance;
        determine the prerequisite information is satisfied based at least in part on the second audio data;
        store the second audio data in the first data store, the first data store being erasable based on a user request to erase data; and
        store the second audio data and the description of the prerequisite information in the second data store, the second data store associated with access rights preventing the user from being able to erase the second audio data and the description of the prerequisite information.

6. The computing system of claim 5, wherein the computer instructions further cause the computing system to:
    determine, from a profile associated with the device, that the prerequisite information is needed; and
    generate new data associated with the profile to reflect the prerequisite information is satisfied.

7. The computing system of claim 5, wherein the computer instructions further cause the computing system to:
    determine, based at least on a profile associated with the device, that the function needs to be activated;
    determine that the function requires the prerequisite information before activation; and
    activate the function, based on the prerequisite information being satisfied.

8. The computing system of claim 5, wherein the computer instructions further cause the computing system to:
    associate the device with the prerequisite information being satisfied;
    receive third audio data;
    determine, based on the third audio data, that the prerequisite information is not satisfied;
    associate the device with the prerequisite information not being satisfied; and
    store the third audio data in the second data store.

9. The computing system of claim 8, wherein the computer instructions further cause the computing system to:
    store a first date and time associated with the first audio data in the second data store;
    store a second date and time associated with the third audio data in the second data store; and determine that the prerequisite information is not satisfied based at least on a comparison of the first date and time to the second date and time.

10. The computing system of claim 5, wherein the computer instructions further cause the computing system to:
identify an electronic communication address associated with the device, based on a profile associated with the device; and
send a message to the electronic communication address, the message confirming that the prerequisite information is satisfied, and allowing an authorized user to generate new data related to the prerequisite information.

11. The computing system of claim 5, wherein the computer instructions further cause the computing system to:
identify a user associated with the user utterance; and
confirm from a profile associated with the device that the user is authorized to provide an utterance and satisfy the prerequisite information.

12. The computing system of claim 5, wherein the computer instructions further cause the computing system to:
cause the device to generate audio related to activation of the function; and
activate the function, wherein the function includes at least one of an intercom-like function or a communication/messaging function.

13. A computer-implemented method, comprising:
determining that prerequisite information related to use of a function is needed;
sending first audio data to a device, the first audio data including a description of the prerequisite information and requesting a user utterance agreeing to the prerequisite information;
receiving second audio data representing the user utterance;
determining the prerequisite information is satisfied based at least in part on the second audio data;
storing the second audio data in a first data store, the first data store being erasable based on a user request to erase data; and
storing the second audio data and the description of the prerequisite information in a second data store, the second data store associated with access rights preventing the user from being able to erase the second audio data and the description of the prerequisite information.

14. The computer-implemented method of claim 13, further comprising:
determining, from a profile associated with the device, that the prerequisite information is needed; and
generating new data associated with the profile to reflect the prerequisite information is satisfied.

15. The computer-implemented method of claim 13, further comprising:
determining, based at least on a profile associated with the device, that the function needs to be activated;
determining that the function requires the prerequisite information before activation; and
activate the function, based on the prerequisite information being satisfied.

16. The computer-implemented method of claim 13, further comprising:
associating the device with the prerequisite information being satisfied;
receiving third audio data;
determining, based on the third audio data, that the prerequisite information is not satisfied;
associating the device with the prerequisite information not being satisfied; and
storing the third audio data in the second data store.

17. The computer-implemented method of claim 16 further comprising:
storing a first date and time associated with the first audio data in the second data store;
storing a second date and time associated with the third audio data in the second data store; and
determining that the prerequisite information is not satisfied based at least on a comparison of the first date and time to the second date and time.

18. The computer-implemented method of claim 13, further comprising:
identifying an electronic communication address associated with the device, based on a profile associated with the device; and
sending a message to the electronic communication address, the message confirming that the prerequisite information is satisfied, and allowing an authorized user to generate new data related to the prerequisite information.

19. The computer-implemented method of claim 13, further comprising:
identifying a user associated with the user utterance; and
confirming from a profile associated with the device that the user is authorized to provide an utterance and satisfy the prerequisite information.

20. The computer-implemented method of claim 13, further comprising:
causing the device to generate audio related to activation of the function; and
activating the function, wherein the function includes at least one of an intercom-like function or a communication/messaging function.

* * * * *